United States Patent
Ramsey et al.

(10) Patent No.: US 9,689,461 B2
(45) Date of Patent: Jun. 27, 2017

(54) DAMPER ASSEBMLY SEALING ARRANGEMENT

(71) Applicant: Schaeffler Technologies AG & Co. KG, Herzogenaurach (DE)

(72) Inventors: John Ramsey, Lucas, OH (US); Markus Steinberger, Macedonia, OH (US); Allen Pervo, Rocky River, OH (US)

(73) Assignee: Schaeffler Technologies AG & Co. KG, Herzogenourach (DE)

( * ) Notice: Subject to any disclaimer, the term of this patent is extended or adjusted under 35 U.S.C. 154(b) by 0 days.

(21) Appl. No.: 14/801,552

(22) Filed: Jul. 16, 2015

(65) Prior Publication Data
US 2016/0025183 A1    Jan. 28, 2016

Related U.S. Application Data

(60) Provisional application No. 62/027,981, filed on Jul. 23, 2014.

(51) Int. Cl.
  *F16F 15/12*  (2006.01)
  *F16F 15/131*  (2006.01)
  *F16J 15/10*  (2006.01)
  *F16F 15/134*  (2006.01)

(52) U.S. Cl.
  CPC .. *F16F 15/13142* (2013.01); *F16F 15/13484* (2013.01); *F16J 15/10* (2013.01); *F16F 2230/30* (2013.01); *Y10T 29/49943* (2015.01)

(58) Field of Classification Search
  CPC ........... F16F 15/13142; F16F 15/13484; F16F 2230/30; F16J 15/10; Y10T 29/49943
  USPC .......... 464/67.1; 29/896.91, 525.06; 277/312
  See application file for complete search history.

(56) References Cited

U.S. PATENT DOCUMENTS

| | | | |
|---|---|---|---|
| 3,561,793 A * | 2/1971 | Rode | F16J 15/127 |
| 5,273,372 A * | 12/1993 | Friedmann | F16F 15/131 464/67.1 X |
| 5,295,910 A * | 3/1994 | Friedmann | F16F 15/13415 464/67.1 X |
| 5,590,750 A * | 1/1997 | Graton | F16F 15/129 464/67.1 X |

* cited by examiner

*Primary Examiner* — Gregory Binda
(74) *Attorney, Agent, or Firm* — Davidson, Davidson & Kappel, LLC

(57) ABSTRACT

A damper assembly for a motor vehicle drive train is provided. The damper assembly includes a spring retainer retaining arc springs; an engine-side cover for connecting to an engine crankshaft, the spring retainer being fixed to the engine-side cover; and a seal configuration between the engine-side cover and the spring retainer. The seal configuration, the engine-side cover and the spring retainer define an arc spring cavity for lubricating fluid to lubricate the arc springs. The seal configuration is configured to prevent lubricating fluid from radially exiting the arc spring cavity during rotation of the damper assembly about a center axis thereof. A method of forming a damper assembly is also provided.

12 Claims, 2 Drawing Sheets

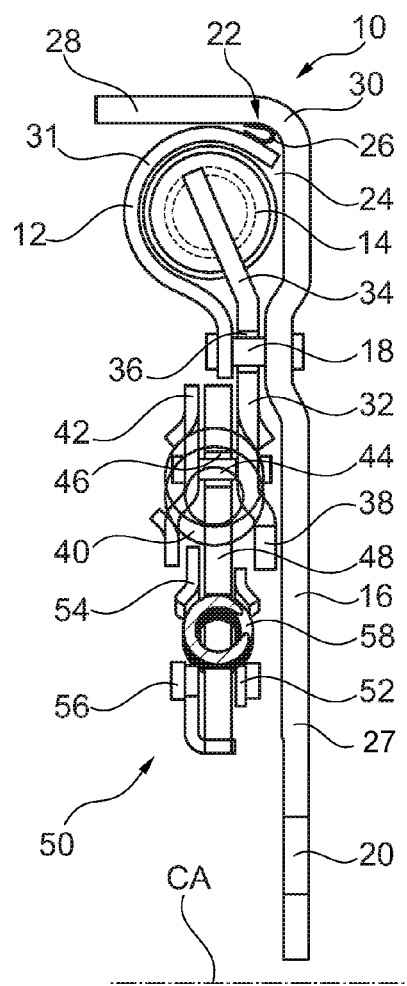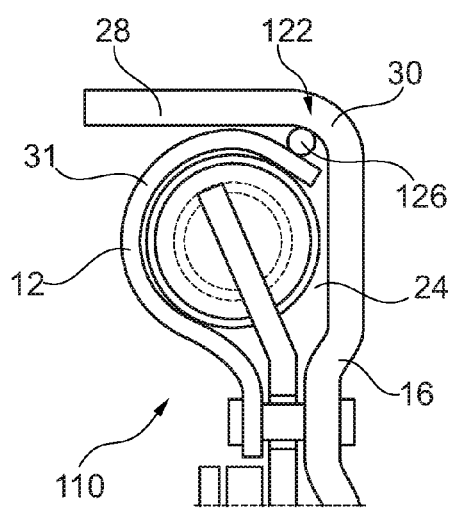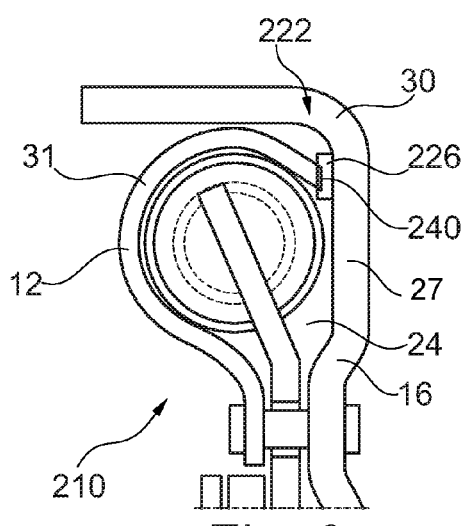

__DAMPER ASSEBMLY SEALING ARRANGEMENT__

This claims the benefit to U.S. Provisional Patent Application No. 62/027,981 filed on Jul. 23, 2014, which is hereby incorporated by reference herein.

The present disclosure relates generally to a damper assemblies for motor vehicle drive trains and more specifically to dual mass flywheels for motor vehicle drive trains.

BACKGROUND

Typical dry arc spring dampers add two unhardened covers to a spring retainer that are laser welded together. A wear surface is created by hardened guide shells. Alternatively, dampers can use a flanged outer diameter to rivet the two unhardened covers together.

SUMMARY OF THE INVENTION

Using covers and/or guide shells in damper assemblies, specifically, dual mass flywheels (DMFWs), requires more components, resulting in higher manufacturing costs and added weight. Additionally, covers and/or guide shells may require a welding operation and decrease arc spring efficiency due to loss of space. Embodiments of the invention may solve the problem of relying on covers and/or guide shells to provide a wear resistant pocket for arc springs in damper designs.

A damper assembly for a motor vehicle drive train is provided. The damper assembly includes a spring retainer retaining arc springs; an engine-side cover for connecting to an engine crankshaft, the spring retainer being fixed to the engine-side cover; and a seal configuration between the engine-side cover and the spring retainer. The seal configuration, the engine-side cover and the spring retainer define an arc spring cavity for lubricating fluid to lubricate the arc springs. The seal configuration is configured to prevent lubricating fluid from radially exiting the arc spring cavity during rotation of the damper assembly about a center axis thereof. In one preferred embodiment, the damper assembly is a DMFW.

A method for forming damper assembly for a motor vehicle drive train is also provided. The method includes fixing a spring retainer retaining arc springs to an engine-side cover and providing a seal configuration between the engine-side cover and the spring retainer such that the seal configuration. The engine-side cover and the spring retainer define an arc spring cavity for lubricating fluid to lubricate the arc springs. The seal configuration is configured to prevent lubricating fluid from radially exiting the arc spring cavity during rotation of the damper assembly about a center axis thereof.

A damper assembly for a motor vehicle drive train is also provided that includes a spring retainer retaining arc springs and a transmission-side plate fixed to the spring retainer. The spring retainer and the transmission-side plate define an arc spring cavity for lubricating fluid to lubricate the arc springs. The spring retainer and the transmission-side plate are connected to prevent lubricating fluid from radially exiting the arc spring cavity during rotation of the damper assembly about a center axis thereof.

BRIEF DESCRIPTION OF THE DRAWINGS

The present invention is described below by reference to the following drawings, in which:

FIG. 1 shows a cross-sectional side view of a damper assembly for a motor vehicle drive train according to a first embodiment of the present invention;

FIG. 2 shows a cross-sectional side view of a damper assembly for a motor vehicle drive train according to a second embodiment of the present invention;

FIG. 3 shows a cross-sectional side view of a damper assembly for a motor vehicle drive train according to a third embodiment of the present invention;

DETAILED DESCRIPTION

Figure 4:
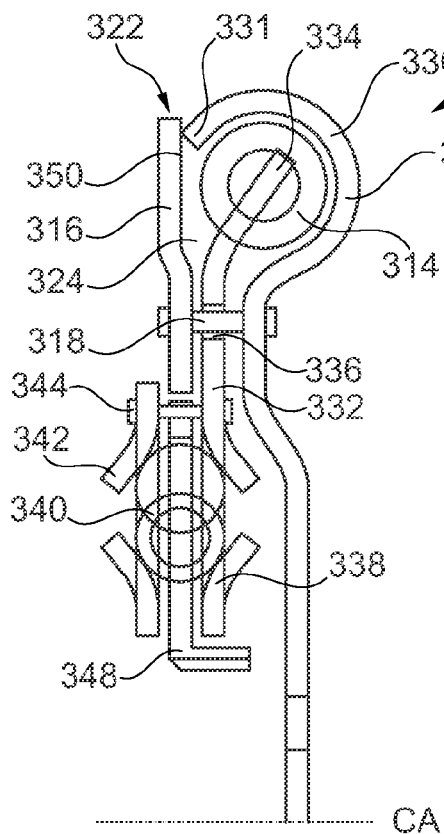
FIG. 4 shows a cross-sectional side view of a damper assembly for a motor vehicle drive train according to a fourth embodiment of the present invention.

FIG. 1 shows a cross-sectional side view of a damper assembly 10, specifically a DMFW, for a motor vehicle drive train in accordance with a first embodiment of the present invention. DMFW 10 includes a spring retainer 12 retaining arc springs 14 that are circumferentially spaced about a center axis CA of DMFW 10. In contrast to covers and/or guide shells, spring retainer 12 is formed by a relatively thin sheet of metal, which has a uniform thickness. Spring retainer 12 provides a pocket through which the arc springs 14 are compressed. An engine-side cover 16 is fixed to spring retainer 12 in this embodiment by rivets 18 that are circumferentially spaced about center axis CA. Engine-side cover 16, at a radially inner portion thereof, includes holes 20 for receiving bolts connecting engine-side cover 16 to an engine crankshaft.

A seal configuration 22 is provided between engine-side cover 16 and the spring retainer 12. Seal configuration 22, engine-side cover 16 and spring retainer 12 define an arc spring cavity 24 for lubricating fluid, for example grease, to lubricate arc springs 14 and provide friction reduction and wear protection for arc springs 14. Seal configuration 22 is configured to prevent the lubricating fluid in arc spring cavity 24 from radially exiting arc spring cavity 24 during rotation of DMFW 10 about center axis CA. In this embodiment, seal configuration 22 is formed by a u-shaped flexible seal 26, which may be formed of elastic material.

Engine-side cover 16 includes a radially extending portion 27 for connecting to the engine crankshaft and an axially extending rim 28 extending axially from an outer radial end of radially extending portion 27. In this embodiment, seal configuration 22, in the form of seal 26, is provided at an inner radial surface of axially extending rim 28 of engine-side cover 16 adjacent a transition region 30 connecting radially extending portion 27 and axially extending rim 28. Spring retainer 12 includes a rounded portion 31 surrounding arc springs 14 and seal 26 is sandwiched between axially extending rim 28 and an outer radial surface of rounded portion 31. In this manner, seal 26 provides an outer radial barrier of cavity 24 for the lubricating fluid at transition region 30.

DMFW 10 further includes an outer flange 32 including a driven portion 34, which is formed on a radially outer end of outer flange 32, including circumferentially spaced projections that extend into the circumferential spaces between arc springs 14. This configuration allows arc springs 14 to drive the outer flange during operation of DMFW. Outer flange 32 also includes circumferentially extending arc-shaped slots 36 formed therein. Rivets 18 pass through slots 36 to fix spring retainer 12 and engine-side cover 16 together. Slots 36 allow relative rotation between engine-side cover 16/spring retainer 12 and outer flange 32. Additionally, slots 36 may each be sized to have a circumferential length that provides clearance to rivets 18 to allow for compression of arc springs 14 under torque during operation of DMFW 10. Slots 36 may be designed to always provide clearance to rivets 18 during operation of DMFW 10 or to use rivets 18 as a stopping feature to prevent overloading of arc springs 14 during operation of DMFW 10.

A radially inner end of outer flange 32 forms an engine-side cover plate 38 providing support for inner springs 40, which are radially inside of arc springs 14, at the engine-side thereof. A transmission-side cover plate 42 is provided on the opposite side of inner springs 40 for supporting a transmission-side thereof. Outer flange 32 extends into circumferential spaces between inner springs 40 such that outer flange 32 is arranged to drive inner springs 40, via cover plates 38, 42, during operation of the DMFW 10. Cover plates 38, 42 are fixed together by rivets 44, which pass through corresponding slots 46 formed in an inner flange 48 positioned axially between cover plates 38, 42. Similar to slots 36, slots 46 allow relative rotation between inner flange 48 and outer flange 32 and may each be sized to have a circumferential length that provides clearance to rivets 44 to allow for compression of springs 40 under torque during operation of DMFW 10.

Inner flange 48 also extends into the circumferential spaces between inner springs 40 such that inner springs 40 are arranged to drive inner flange 48 during operation of DMFW 10. Inner flange 48 further includes a splined inner radial surface for connecting to a hub for transmitting torque to a transmission. An anti-rattle device 50 is provided on inner flange 48 to preload the spline connection of inner flange 48. Anti-rattle device 50 includes an engine-side preload plate 52, a transmission-side preload plate 54, a preload rivet 56 connecting plates 52, 54 and preload springs 58 supported by plates 52, 54.

FIG. 2 shows a cross-sectional side view of a DMFW 110 in accordance with a second embodiment of the present invention. DMFW 110 is formed in the same manner as DMFW 10 except that it includes a seal configuration 122 is provided between engine-side cover 16 and the spring retainer 12 at the inner radial surface of engine-side cover 16 adjacent transition region 30. In this embodiment, seal configuration 122 is formed by a silicone sealant 126 contacting an inner radial surface of axially extending rim 28 of engine-side cover 16 adjacent a transition region 30 and an outer radial surface of rounded portion 31. In this manner, silicone sealant 126 provides an outer radial barrier of cavity 24 for the lubricating fluid at transition region 30.

FIG. 3 shows a cross-sectional side view of a DMFW 210 in accordance with a third embodiment of the present invention. DMFW 210 is formed in the same manner as DMFW 10 except that it includes a seal configuration 222 is provided between engine-side cover 16 and the spring retainer 12 at the inner axial surface of engine-side cover 16 at an area near transition region 30. In this embodiment, seal configuration 222 is formed by a bonded paper seal 226 contacting the inner axial surface of radially extending portion 27 of engine-side cover 16 and an axial rim 240 of spring retainer 12. Spring retainer 12 has been machined at axial rim 240 to provide a surface that is parallel with the inner axial surface of radially extending portion 27. Bonded paper seal 226 is sandwiched between the machined surface of axial rim 240 and the inner axial surface of radially extending portion 27. In this manner, bonded paper seal 226 provides an outer radial barrier of cavity 24 for the lubricating fluid at transition region 30.

FIG. 4 shows a cross-sectional side view of a DMFW 310 in accordance with a fourth embodiment of the present invention. DMFW 310 includes DMFW 10 includes a spring retainer 312 retaining arc springs 314 that are circumferentially spaced about a center axis CA of DMFW 310. Spring retainer 312 provides a pocket through which the arc springs 314 are compressed. An engine-side cover is omitted in this embodiment and spring retainer 312, compared to spring retainer 12, extends further radially and is configured for connection to the engine crankshaft. Spring retainer 312, at a radially inner portion thereof, includes holes 320 for receiving bolts connecting spring retainer 312 to the engine crankshaft.

A transmission-side plate 316 is provided on the transmission side of spring retainer 312 for forming a seal configuration 322 with spring retainer 312 to define an arc spring cavity 324 for lubricating fluid for arc springs 314. Seal configuration 322 is configured by an engine-side axial surface 350 of a radially outer portion of transmission-side plate 316 being preloaded against an axial rim 331 of spring retainer 312 by rivets 318 to prevent the lubricating fluid in arc spring cavity 324 from radially exiting arc spring cavity 324 during rotation of DMFW 310 about center axis CA. Axial rim 331 is formed at a transmission-side axial edge of a rounded portion 310 of spring retainer 312 partially surrounding and retaining arc springs 314.

DMFW 10 further includes an outer flange 332 including a driven portion 334, which is formed on a radially outer end of outer flange 332 and as it extends radially outward also extends axially away from transmission-side plate 316. Driven portion 334 includes circumferentially spaced projections that extend into the circumferential spaces between arc springs 314. Outer flange 332 is positioned between transmission-side plate 316 and spring retainer 312 and includes circumferentially extending arc-shaped slots 336 formed therein in the same manner as slots 36.

A radially inner end of outer flange 332 forms an engine-side cover plate 338 providing support for inner springs 340 with a transmission-side cover plate 42 in the same manner as described above with respect to FIG. 1. Outer flange 332 extends into circumferential spaces between inner springs 340 such that outer flange 332 is arranged to drive inner springs 340, via cover plates 338, 342, which are fixed together by rivets 344. An inner flange 348 also extends into the circumferential spaces between inner springs 340 such that inner springs 340 are arranged to drive inner flange 348 during operation of DMFW 310. Inner flange 348 further includes a splined inner radial surface for connecting to a hub for transmitting torque to a transmission.

Figure 5A:
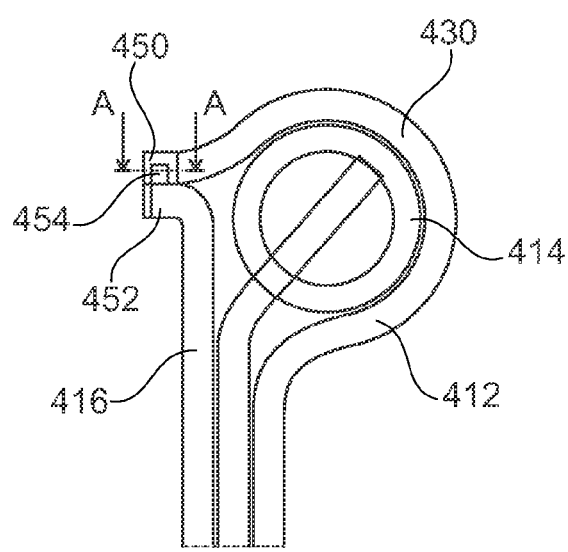
FIG. 5a shows a cross-sectional side view of a damper assembly for a motor vehicle drive train according to a fifth embodiment of the present invention.

FIG. 5a shows a cross-sectional side view of a DMFW 410 in accordance with a fifth embodiment of the present invention. DMFW 410 is formed in the same manner as DMFW 310 except that it includes a spring retainer 412 and a transmission-side plate 416 are fixed together in a different manner than spring retainer 312 and transmission-side plate 316. In this embodiment, a seal configuration 422 is formed by a flange connection formed by a first flange portion 450 of spring retainer 412 extending away from arc springs 414 and a rounded portion 430 springs and a second flange portion 452 of transmission-side plate 416 extending away from arc springs 414. Spring retainer 412 and transmission-side plate 416 are fixed together at the first and second flange portions 450, 452. In particular, first and second flange portions 450, 452 are fixed together by a staked tab 454.

Figure 5B:
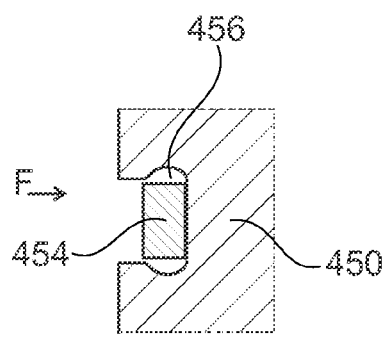
FIGS. 5b and 5c schematically show a view along A-A in FIG. 5a illustrating the formation of a staked tab to create a flanged connection.
Figure 5C:
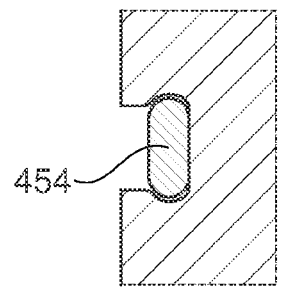

FIGS. 5b and 5c schematically show a view along A-A in FIG. 5a illustrating the formation of staked tab 454 to create the flanged connection. FIG. 5a shows tab 454 before staking. Tab 454 is positioned inside of a cutout profile 456 formed in first flange portion 450 of spring retainer 412. A force F is then applied by a staking tool to expand tab 454 in the direction of cutout profile 456 such that tab 454 is held snugly held in cutout profile 456 as shown in FIG. 5c.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A damper assembly for a motor vehicle drive train comprising:
    a spring retainer retaining arc springs;
    an engine-side cover for connecting to an engine crankshaft, the spring retainer being fixed to the engine-side cover; and
    a seal configuration between the engine-side cover and the spring retainer, the seal configuration, the engine-side cover and the spring retainer defining an arc spring cavity for lubricating fluid to lubricate the arc springs, the seal configuration configured to prevent lubricating fluid from radially exiting the arc spring cavity during rotation of the damper assembly about a center axis thereof, the engine-side cover including a radially extending portion and an axially extending rim at an outer end of the radially extending portion, the spring retainer including a rounded portion surrounding outermost circumferential surfaces of the arc springs and extending axially toward the radially extending portion of the engine-side cover to join an axial rim, the axially extending rim of the engine-side cover being radially outside of the rounded portion of the spring retainer and extending axially away from the radially extending portion past an outermost circumference of the rounded portion, the seal configuration being sandwiched radially between an inner circumferential surface of the axially extending rim and an outer circumferential surface of the rounded portion or being sandwiched axially between the axial rim of the spring retainer and the radially extending portion.

2. The damper assembly as recited in claim 1 wherein the damper assembly is a dual mass flywheel.

3. The damper assembly as recited in claim 1 further comprising a rivet fixing the spring retainer to the front cover.

4. The damper assembly as recited in claim 1 wherein the seal configuration includes a u-shaped flexible or a silicone sealant.

5. The damper assembly as recited in claim 1 further comprising an outer flange extending into circumferential spaces between the arc springs such that the arc springs are arranged to drive the outer flange during operation of the damper assembly.

6. The damper assembly as recited in claim 5 further comprising inner springs radially inside of the arc springs, the outer flange extending into circumferential spaces between the inner springs such that the outer flange is arranged to drive the inner springs during operation of the damper assembly.

7. The damper assembly as recited in claim 6 further comprising an inner flange extending into the circumferential spaces between the inner springs such that the inner springs are arranged to drive the inner flange during operation of the damper assembly.

8. The damper assembly as recited in claim 7 further comprising an anti-rattle device arranged on the inner flange, the anti-rattle device being configured to preload a spline connection of the inner flange.

9. A method of forming a damper assembly for a motor vehicle drive train comprising:
    fixing a spring retainer retaining arc springs to an engine-side cover; and
    providing a seal configuration between the engine-side cover and the spring retainer such that the seal configuration, the engine-side cover and the spring retainer define an arc spring cavity for lubricating fluid to lubricate the arc springs, the seal configuration configured to prevent lubricating fluid from radially exiting the arc spring cavity during rotation of the damper assembly about a center axis thereof, the engine-side cover including a radially extending portion and an axially extending rim at an outer end of the radially extending portion, the spring retainer including a rounded portion surrounding outermost circumferential surfaces of the arc springs and extending axially toward the radially extending portion of the engine-side cover to join an axial rim, the axially extending rim of the engine-side cover being radially outside of the rounded portion of the spring retainer and extending axially away from the radially extending portion past an outermost circumference of the rounded portion, the seal configuration being sandwiched radially between an inner circumferential surface of the axially extending rim and an outer circumferential surface of the rounded portion or being sandwiched axially between the axial rim of the spring retainer and the radially extending portion.

10. The method as recited in claim 9 wherein the damper assembly is a dual mass flywheel.

11. The method as recited in claim 9 further comprising providing an outer flange axially between the spring retainer and the engine-side cover such that the outer flange extends into circumferential spaces between the arc springs and the arc springs are arranged to drive the outer flange during operation of the damper assembly.

12. The method as recited in claim 11 wherein the fixing of the spring retainer to the engine-side cover includes providing rivets passing through slots in the outer flange to fix the spring retainer to the engine-side cover.

* * * * *